(12) United States Patent
Goh (10) Patent No.: US 7,424,148 B2
(45) Date of Patent: Sep. 9, 2008

(54) METHOD AND SYSTEM FOR CONTRAST ENHANCEMENT OF DIGITAL VIDEO

(75) Inventor: Kwong Huang Goh, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 942 days.

(21) Appl. No.: 10/878,981

(22) Filed: Jun. 28, 2004

(65) Prior Publication Data

US 2005/0031201 A1    Feb. 10, 2005

(30) Foreign Application Priority Data

Jun. 27, 2003    (SG)    .............. 200303729-8

(51) Int. Cl.
*G06K 9/00*    (2006.01)
*G06K 9/40*    (2006.01)
*H04N 5/52*    (2006.01)

(52) U.S. Cl. ........................ 382/169; 382/274

(58) Field of Classification Search ............... 382/162, 382/164, 167, 168, 169, 171, 190, 218, 219, 382/254, 260–264, 274; 348/672, 673, 687, 348/E5.073, E5.119

See application file for complete search history.

(56) References Cited

U.S. PATENT DOCUMENTS

| | | | |
|---|---|---|---|
| 5,383,168 A | 1/1995 | O'Brien et al. | |
| 5,546,134 A | 8/1996 | Lee | |
| 5,808,697 A | 9/1998 | Fujimura et al. | |
| 5,937,090 A | 8/1999 | Kim | |
| 5,982,926 A * | 11/1999 | Kuo et al. | 382/167 |
| 6,148,103 A | 11/2000 | Nenonen | |
| 6,163,621 A * | 12/2000 | Paik et al. | 382/169 |
| 6,259,472 B1 | 7/2001 | Park | |
| 6,826,310 B2 * | 11/2004 | Trifonov et al. | 382/274 |
| 6,873,742 B2 * | 3/2005 | Schu | 382/274 |
| 7,102,697 B2 * | 9/2006 | Lei et al. | 348/678 |
| 7,127,123 B2 * | 10/2006 | Wredenhagen et al. | 382/274 |
| 7,142,724 B2 * | 11/2006 | Oh et al. | 382/274 |
| 7,239,756 B2 * | 7/2007 | Sartor et al. | 382/274 |
| 2004/0037473 A1 * | 2/2004 | Ahmed et al. | 382/254 |
| 2004/0081369 A1 * | 4/2004 | Gindele et al. | 382/274 |
| 2004/0101207 A1 * | 5/2004 | Langan | 382/274 |
| 2006/0171584 A1 * | 8/2006 | Sandrew | 382/162 |

* cited by examiner

*Primary Examiner*—Amir Alavi
(74) *Attorney, Agent, or Firm*—Lisa K. Jorgenson; E. Russell Tarleton; Seed IP Law Group PLLC (57) ABSTRACT

A method for enhancing the contrast of video pictures that includes the steps of receiving an input video signal; extracting a picture from said input video signal; determining an active window for said picture; calculating a histogram for luminance values of pixels in said active window of said picture; determining characteristics of said histogram; selecting one suitable mapping function from a plurality of mapping functions based on the determined characteristics of said histogram; and mapping the luminance value of each pixel in said picture in accordance with said selected mapping function.

23 Claims, 8 Drawing Sheets

METHOD AND SYSTEM FOR CONTRAST ENHANCEMENT OF DIGITAL VIDEO

BACKGROUND OF THE INVENTION

1. Field of the Invention

The present invention relates to a method and system for enhancing the overall picture contrast of digital video signals by using an automatically configurable mapping function that is automatically selected from a predetermined set of mapping functions based on set criteria.

2. Description of the Related Art

The need for video contrast enhancement may arise due to the picture contrast distortions caused by transmission limitations or the limitations of video capturing devices or media. Examples of video signals requiring contrast enhancement are video pictures that are too dark, too bright, too low in contrast or are over contrast.

Mapping functions are normally used to map the original luminance values for each respective pixel in a picture or video frame into new respective values. FIGS. 1 to 4 illustrate different examples of such mapping functions. In FIGS. 1 to 4, the horizontal axis represents the original luminance values of those pixels in a picture and the vertical axis represents the adjusted pixel luminance values using each mapping function based on each pixel's original rumination value. The mapped output picture generally improves the contrast of the picture and gives a better subjective quality.

In U.S. Pat. Nos. 5,383,168 and 6,259,472, the mapping functions generated are based on the normalized Cumulative Density Function ("CDF") of the picture histogram. In U.S. Pat. No. 6,148,103, mapping functions are generated by comparing the histogram for the current picture being processed with the CDF of previously processed histograms corresponding to earlier field pictures. In U.S. Pat. No. 5,937,090, the original picture is first quantized and then the CDF of the quantized picture histogram is used to generate the mapping functions. In U.S. Pat. No. 5,546,134, some pre-determined types of mapping curves are used, and the average brightness level in the video input signal is used to decide the type of curve to be used. In U.S. Pat. No. 5,808,697, each picture is divided into blocks and the average luminance level of each block, determined over a series of frames or pictures is used to select an appropriate mapping function for that block, and an enhancer maps each pixel in that block according to both the selected mapping function for that block and the mapping functions selected for adjacent areas, and the mapping results are combined by a weighted-average processor.

It is known that mapping functions generated by the CDF of the picture histogram tend to over-enhance or over-correct the contrast, resulting in over-contrast pictures. Mapping functions that are generated by picture pre-processing, for example performing quantization or filtering, may involve complex processing, which can be slow to process.

As for the selection of predetermined types of mapping curves using only the average brightness of blocks in each picture, the technique may be too simplistic and lack the accuracy required for determining the most appropriate mapping function to be used. Methods that divide a picture into blocks and select mapping functions for each block according to its difference with the average block luminance level can be highly complex and flickering could also result.

For any existing system that has selectable or switchable mapping functions in place but lack an automatic mapping functions selection mechanism, the existing techniques described above either require too complex design changes to such a system or the mapping function selection method is too simplistic and lacks accuracy.

A need therefore exists for a method and apparatus for enhancing the overall picture contrast of video signals to provide better subjective quality, which also overcomes the shortcomings associated with over-correction and complexity using existing techniques.

BRIEF SUMMARY OF THE INVENTION

The disclosed embodiments of the invention enhance the overall picture contrast of a digital video signal so that it gives a better subjective quality without introducing artifacts that degrade the picture quality and enhance the picture contrast without introducing flickering.

In accordance with one embodiment of the present invention, a method for enhancing the contrast of video pictures is provided that includes the steps of:

(i) receiving an input video signal;
(ii) extracting a picture from said input video signal;
(iii) determining an active window for said picture;
(iv) calculating a histogram for luminance values of pixels in said active window of said picture;
(v) determining characteristics of said histogram;
(vi) selecting one suitable mapping function from a plurality of mapping functions based on the determined characteristics of said histogram; and
(vii) mapping the luminance value of each pixel in said picture in accordance with said selected mapping function.

Preferably, after step (v), the step of step (v)(a) for determining whether said picture is part of a smooth scene sequence.

Preferably, after step (v)(a) the step of step (v)(b) preventing the selection of a new mapping function where said picture is part of a smooth scene sequence.

Preferably, step (iii) determines said active window for said picture by including only pixels from said picture that do not form part of any black bars at the boundaries of said picture.

Preferably, step (v) includes the step of calculating the weighted difference between the value of each said bin of said histogram and the corresponding value in the same said bin of an earlier histogram relating to an earlier processed picture.

Preferably, step (v) includes the step of determining, for said histogram containing a maximum number of M bins, where M is an integer, where each said bin in said histogram are sequentially numbered, n, according to the pattern n, n+1, n+2 and so on, where n is greater than or equal to zero, the sum of Q consecutive bins by taking the sum of Q consecutive terms, starting from the term n=0 for all terms of n except for the terms of n greater than the term (M−n).

Preferably, step (vi) includes the step of determining from said histogram whether said picture is low in contrast, and if said picture is determined to be low in contrast, determining whether a Grey Stretch mapping function is suitable for correcting said contrast; and where said picture is not low in contrast; determining whether said picture is over contrast.

Preferably, if said Grey Stretch mapping function is suitable for correcting said contrast, then a Grey Stretch mapping function is selected and associated parameters for said Grey Stretch mapping function are determined and applied to said Grey Stretch mapping function; and wherein if said Grey Stretch mapping function is not suitable, determining whether a White Stretch mapping function is suitable for correcting said contrast.

Preferably, if said White Stretch mapping function is suitable for correcting said contrast, then a White Stretch mapping function is selected and associated parameters for said White Stretch mapping function are determined and applied to said White Stretch mapping function; and wherein if said White Stretch mapping function is not suitable, a Black Stretch mapping function is selected and associated parameters for said Black Stretch mapping function are determined and applied to said Black Stretch mapping function.

Preferably, if said histogram is over contrast, a Black and White Stretch mapping function is selected and associated mapping parameters are determined and applied to said Black and White Stretch mapping function; and wherein if said Black and White Stretch mapping function is not suitable, a Black Stretch mapping function is selected and associated parameters for said Black Stretch mapping function are determined and applied to said Black Stretch mapping function.

BRIEF DESCRIPTION OF THE DRAWINGS

Preferred embodiments of the present invention are herein described, by way of example only, with reference to the accompanying drawings, wherein.

DETAILED DESCRIPTION OF THE INVENTION

Figure 5:
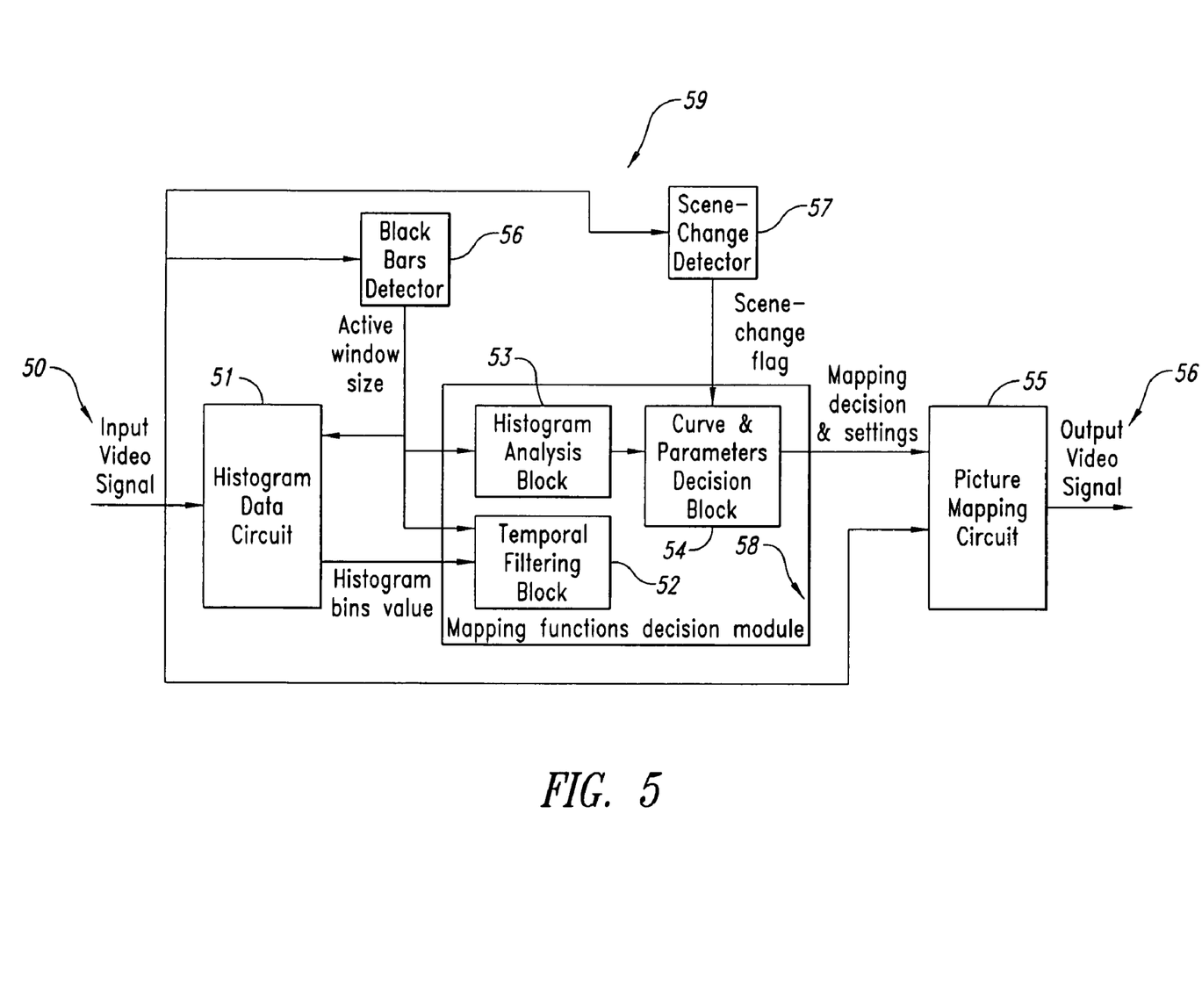
FIG. 5 is a block diagram showing the main components and process flow of the Contrast Enhancer.

FIG. 5 is a block diagram of a contrast enhancement device showing the main components thereof and indicated as Contrast Enhancer 59. Preferably, the Contrast Enhancer 59 has a Histogram Data Circuit 51, Black Bars Detector Module 56, Scene Change Detector 57, a Mapping Functions Decision Module 58 and a Picture Mapping Circuit 55. The Histogram Data Circuit 51 receives a digital input video signal 50 and generates a histogram corresponding to each picture or frame extracted from the digital input video signal 50. The generated histogram represents the varying degrees of luminance of the pixels in each picture. The generated histogram may be of higher complexity for greater accuracy, for example representing the 8-bit grey level output of the current picture using a 256-band histogram, or alternatively be of lower complexity allowing faster processing, for example using a 16-band histogram similar to the one shown in FIG. 6.

Figure 6:
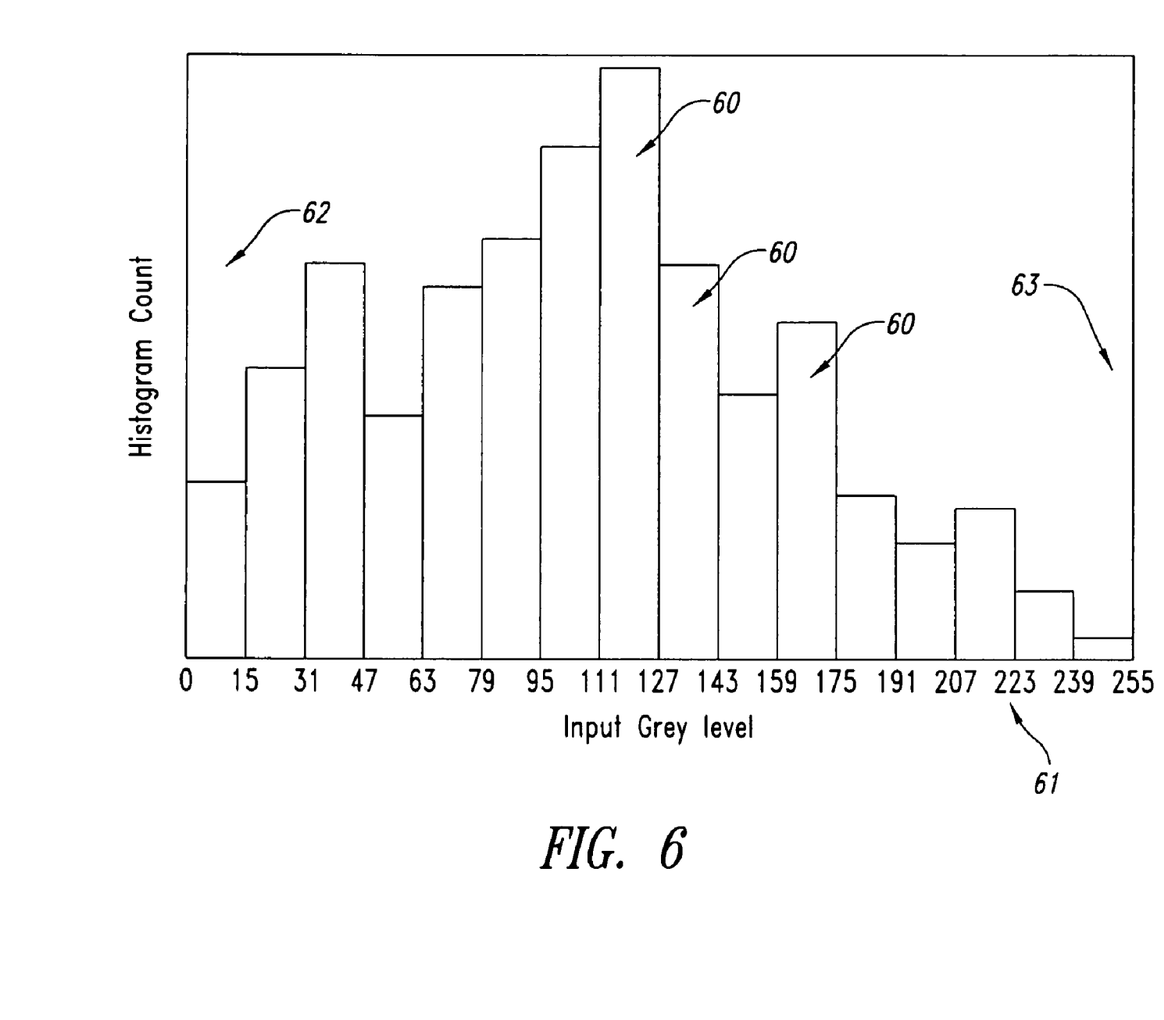
FIG. 6 is a diagram showing an example of a 16-band low-complexity output histogram data.

As shown in FIG. 6, each band 60 (or bin) in the histogram has equal thickness and spreads across the full range of brightness (or the respective input gray level for each pixel) as represented by the horizontal axis 61 (or the brightness axis). The height of each band represents the proportion of pixels in a picture having luminance intensities within the different predefined ranges for each respective band. The region 62 to the left of the generated histogram represents the darkest portions or pixels of a picture while the region 63 to the right of the generated histogram represents the brightest portions of a picture. After generating a histogram, the Histogram Data Circuit 51 passes the histogram bin values to the Mapping Functions Decision Module 58.

The exemplary descriptions of the embodiments of the invention in this specification assume that the Histogram Data Circuit 51 generates a 16-band histogram (or a histogram with 16 bins), where the first bin is labeled as bin 0 and the last bin is labeled as bin 15.

As shown in FIG. 5, the Black Bars Detector 56 also receives the digital input video signals 50 and processes the signal to detect any horizontal or vertical black bars which may occur at the boundaries of each picture, for example, the black bars caused by the letter-boxing effect. The Black Bars Detector 56 extracts the active window information, or those pixels of each picture representing the actual image to the exclusion of those pixels representing the black bars contained in the picture. The active window information is passed to the Histogram Data Circuit 51 to serve as the raw data for generating a histogram for that picture. The exclusion of pixels corresponding to the black bars enables a more accurate histogram to be generated to reflect the true luminance of those pixels in the picture comprising the actual image. As a result, the presence of black bars in a picture does not affect the histogram calculations performed by the Histogram Data Circuit 51 and also do not affect the type of mapping function selected by the Mapping Function Decision Module 58 to enhance the picture. The Mapping Functions Decision Module 58 includes a Temporal Filtering Block 52, Histogram Analysis Block 53 and a Curve & Parameter Decision Block 54. Active window information for each picture is also passed to both the Temporal Filtering Block 52 and Histogram Analysis Block 53 in the Mapping Functions Decision Module 58.

The Scene Change Detector 57 also receives the digital input video signal 50 and processes the signal to trigger a flag (the "Scene Change Flag") to be set, thus to indicate whether a scene change is occurring in the current picture being processed. The status of the Scene Change Flag is used by the Curve & Parameters Decision Block 54 in the Mapping Function Decision Module 58 to decide whether a new type of mapping function should be selected for enhancing the picture being processed.

Generally, the Temporal Filtering Block 52 filters the histogram data (or the bin values from one histogram) provided by the Histogram Data Circuit 51 to reduce fluctuations in the histogram data that will lead to flickering. The fluctuations of the histogram refers to the fluctuations in the time domain (or otherwise known as temporal fluctuations), for example, the histogram data of the current field picture can be quite different from the previous field pictures even though the overall contrast of these field pictures looks similar. Note that it is not the fluctuation of the histogram data that causes flickering, but the fast changes in the selection of mapping functions in response to the fast changes (or fluctuations) in the histograms for field pictures. The Histogram Analysis Block 53 computes some statistical information (as described further below) based on the field picture being processed, which is then used by the algorithm in the Curve & Parameters Decision Block 54 to decide which type of mapping curve to use on the field picture and also to determine the values of the different parameters for the selected mapping curve. The Curve & Parameters Decision Block 54 passes the mapping curve selection together with the associated parameter settings to the Picture Mapping Circuit 55. The Picture Mapping Circuit 55 then uses those selections and settings to generate a specifically calibrated mapping curve and applies that mapping to the field picture derived from the digital input video signal 50 to create a new mapped field picture released as the output video signal 56.

In the Temporal Filtering Block 52, the histogram data received from the Histogram Data Circuit 51 is temporally filtered to prevent any rapid fluctuations of the range and gain settings corresponding to the selected mapping curve, which may result in flickering. An adaptive filter is used so that it can quickly adapt to sudden changes of the histogram and also to permit only small or no changes to the parameter settings for the selected mapping curve (or mapping function) for minor changes in the histogram. Thus only large variations in histograms will result in an emphasis on the current histogram of the current (or incoming) field picture, whereas small histogram variations will result in an emphasis on the filtered histograms of the previously processed field pictures. The adaptive filter is implemented by adjusting the weighting of both the previous filtered histogram (being the histogram corresponding to a previous field picture processed immediately before the current field picture) and histogram corresponding to the current field picture according to the differences between the two histograms. A preferred implementation of the adaptive weighting computation according to the histogram differences can be described by way of the following pseudo-code:

Listing 1

```
For i = 0 to 15 {
    diff += ABS(curr_histobin(i)−histobin(i))
}
weight = (diff * WEIGHT_MAX + num_pixels_per_win) /
(2 * num_pixels_per_win)
``` where i is the bin number in the histogram numbered from 0 to 15 (assumed to be 16 for the above example); ABSO is an absolute function; curr_histobin(i) is the input bin value corresponding to the $i^{th}$ bin of the picture histogram for the current field picture; histobin(i) is the filtered output bin value corresponding to the $i^{th}$ bin from the temporally filtered histogram of the most recently processed field picture; num_pixels_per_win is the number of pixels per active field window passed into the Histogram Data Circuit 51; diff is the sum of absolute values of the difference between the value in each bin in the current picture histogram and the value of the corresponding bin of the filtered histogram bin output; weight is the estimated weighting or emphasis to be given to the histogram data of the current or incoming field picture; and WEIGHT_MAX defines the maximum value of weight for a range of estimated weight values. A higher value of diff will lead to a higher weight value (i.e., more emphasis on the histogram of the incoming field picture).

Note that the term (num_pixels_per_win*2) defines the maximum range of diff, and the rounding-up of weight is done by adding num_pixels_per_win in the equation. To minimize rapid fluctuations in the histogram, it is preferable to set the value of WEIGHT_MAX to 50 and the value of weight to be any integer between 0 and 50. A higher value of WEIGHT_MAX means a larger number of previous field picture histogram data will be taken into the filtering process. If the value of WEIGHT_MAX is set too high, this results in high latency or slowness in adapting to the changes in contrast in the field picture. However, if the value of WEIGHT_MAX is set too small, this leads to very drastic changes of the mapping functions and thus causes flickering, which defeats the purpose of filtering. Typically, the value of WEIGHT_MAX may be set within the values 20 to 100 inclusive. The range of values for weight depends on the value for WEIGHT_MAX. The computed weight value will always be within 0 to WEIGHT_MAX inclusive.

Listing 1 is to compute the estimated weight value and is the first part of the filtering process. The second (or main) part of this filtering process is provided in Listing 2, which makes use of the weight value to perform the required filtering. The variables referred to in Listing 2 correspond to the same variables in Listing 1.

Listing 2

```
For i = 0 to 15 {
    histobin(i) = (curr_histobin(i) * weight + histobin(i)) * (WEIGHT_
    MAX − weight) / WEIGHT_MAX
}
```

The Histogram Analysis Block 53 receives the values corresponding to each of the bins in the input histogram from the Temporal Filtering Block 52. Each input bin value represents the number of pixels in each respective bin. The Histogram Analysis Block 53 performs certain statistical calculations on the current histogram bin values to determine the approximate shape and distribution of the histogram.

The first step of the calculations in the Histogram Analysis Block 53 involves calculating the sum of the values in consecutive histogram bins. The summation process starts from calculating the sum of two consecutive bins, denoted as Hist_sum2(i), and preferably stops after the completion of calculating the sum of seven consecutive bins, denoted as Hist_sum7(i). More than seven bins may be summed if desired, but this would be more appropriate for higher complexity histograms.

For example, assuming that the input histogram has 16 bins that are consecutively labeled from bin 0 to bin 15, the process of calculating the sum of two consecutive bins involves adding the value from a first bin (e.g., bin 0) to the value of a second bin (e.g., bin 1) being the next consecutive bin immediately adjacent to the aforementioned first bin. Preferably, the process begins from the lowest bin number (i.e., bin 0) and is repeated for each consecutive bin (i.e., for bins 1, 2, 3 . . . and so on) until the sum has been calculated for the second last bin (i.e., bin 14). The sum of two consecutive bins means that every addition must be between two consecutive and immediately adjacent bins (e.g., between bins 0 and 1; 1 and 2; 2 and 3, and so on). The process for calculating the sum of two consecutive bins preferably starts from bin 0 and then proceeds in a sequential pattern starting from bins 1, 2 and 3 and so on until the sum has been calculated for the second last bin (i.e., bin 14), which corresponds to the last possible bin that the sum of two consecutive bins can be calculated.

Similarly, for calculating the sum of three consecutive bins, the value from a first bin (e.g., bin 0) is added to the value of a second bin (e.g., bin 1) and the total between the first bin and second bin is then added to a third bin (e.g., bin 2). Similarly, the sum of three consecutive bins means that every addition must be between three consecutive bins, each of the bins in the set of three bins being immediately adjacent to at least one of the other bins in the same set. For example, a sum of three consecutive bins may be made between bins 0, 1 and 2. Another example is the sum between bins 1, 2 and 3. Assuming there to be 16 bins in the histogram, each bin being labeled from bin 0 to bin 15, the process for calculating the sum of three consecutive bins preferably starts from bin 0 and then proceeds in a sequential pattern starting from bins 1, 2 and 3 and so on until the sum has been calculated for the third last bin (i.e., bin 13), which corresponds to the last possible bin that the sum of three consecutive bins can be calculated.

In general terms, where the input histogram has a maximum number of M bins, where M is an integer, and each of the bins are sequentially numbered according to the pattern n, n+1, n+2 and so on, where n is a positive integer starting from zero, the sum of Q consecutive bins is calculated by taking the sum of Q consecutive terms, starting from the term (n=0), for all terms of n except for the terms of n greater than the term (M−n).

Likewise for the consecutive sums of 3, 4, 5, 6, and 7 bins may be respectively calculated from the range of i terms indicated as follows:

Hist_sum3(i), for terms of i=0 to 13;

Hist_sum4(i), for terms of i=0 to 12;

Hist_sum5(i), for terms of i=0 to 11;

Hist_sum6(i), for terms of i=0 to 10; and

Hist_sum7(i), for terms of i=0 to 9;

Thus for the case of Hist_sum7(i), the algorithm calculates the sum of seven consecutive histogram bins, starting from the first bin (i.e., bin 0) for each consecutive bin (i.e., bins 1, 2, 3 and so on) and not stopping until after the sum starting from the first bin to the tenth bin (i.e., bin 9). Phrased another way, Hist_sum7(i) represents the sum of the bin values for bins 0 to 6; 1 to 7; 2 to 8; 3 to 9; 4 to 10; 5 to 11; 6 to 12; 7 to 13; 8 to 14; and 9 to 15.

The second step of the calculations performed by the Histogram Analysis Block 53 involves identifying whether the input histogram is heavily concentrated around particular bins, or whether there are any narrowly and heavily concentrated histogram bins. This is done by checking all the sets of Hist_sumN(i), where preferably N in this step satisfies the condition $2 \leq N \leq 7$.

For example (assuming N=7) if any of the sums for Hist_sum7(i) exceeds a certain predefined threshold (i.e., sum7_thres in this example), the histogram is said to be heavily concentrated. For example, if any of the sums for Hist_sum7(i) (e.g., Hist_sum7(4)) exceeds a certain pre-determined threshold (i.e., sum7_thres), the histogram is said to be heavily concentrated at bins 4 to 10. The maximum value of the sums for Hist_sum7(i) (denoted as max7_sum) that exceeded the threshold is determined and the corresponding position, i, (denoted as max7_position) is also determined using the pseudo-code provided in Listing 3:

Listing 3

```
max7_sum = 0
For i=0 to 9 {
    If (Hist_sum7(i) > sum7_thres) {
```

-continued

Listing 3

```
        If (Hist_sum7(i) > max7_sum) {
            max7_sum = Hist_sum7(i)
            max7_position = i
        }
    }
}
```

The maximum value (generically expressed as maxN_sum) which exceeds the threshold (generically expressed as sumN_thres) and also the respective i position and the, generically expressed, maxN_position, for each set of sums for Hist_sumN(i) are preferably determined for values of N where $2 \leq N \leq 7$ using the pseudo-code provided in Listing 3. The example in Listing 3 assumes that N=7.

The threshold value, generically expressed as sumN_thres, is also referred to as the contrast-sensitivity associated with the value of N. The highest threshold value corresponding to the highest value of integer N is preferably calculated in accordance with Equation 1. The number of pixels per active field window is equal to the sum of all the values in all the bins of the histogram.

$$\text{contrast-sensitivity} = 90\% \times \text{number of pixels per active window} \quad \text{Equation 1}$$

Based on the threshold value for the highest value of N, the threshold values corresponding to smaller values of N can be determined by pegging to the contrast-sensitivity of a threshold value corresponding to the highest value of N. Thus in the example where the values of N fall within the range $2 \leq N \leq 7$, it is preferable that the corresponding thresholds for each value of N are set according to Listing 4. Preferably, the threshold values corresponding to values of N smaller than the largest value of N becomes progressively smaller as the value of N decreases. Preferably further, there is a consistent difference between adjacent threshold values.

Listing 4

```
sum7_thres = contrast-sensitivity
sum6_thres = contrast-sensitivity - 3%
sum5_thres = contrast-sensitivity - 6%
sum4_thres = contrast-sensitivity - 9%
sum3_thres = contrast-sensitivity - 12%
sum2_thres = contrast-sensitivity - 15%
```

The third step of the calculations performed by the Histogram Analysis Block 53 involves estimating the average brightness of the field picture using the bin inputs from the corresponding picture histogram which is later used in the Curve & Parameters Decision Block 54. Preferably, the average brightness, est_avg_brightness, is estimated using the pseudo-code provided in Listing 5:

Listing 5

```
For i= 0 to 15 {
    Sum += histobin(i) * (i+1)
}
est_avg_brightness = Sum * 16/(num_pixels_per_win)
``` where histobin(i) refers to each of the temporally filtered output bins of current picture histogram (assuming that a 16-band histogram is used and that i=0 to 15 corresponds to each of the bins in the 16-band histogram).

Certain parameters calculated by the Histogram Analysis Block 53 are passed to the Curve & Parameters Decision Block 54 for deciding whether the histogram belongs to one of the "histogram distorted" pictures which can be corrected or enhanced using one of the four predetermined types of mapping curves. The Curve & Parameters Decisions Block 54 also determines the strength or the steepness of each of the chosen type of mapping curve.

Figure 7:
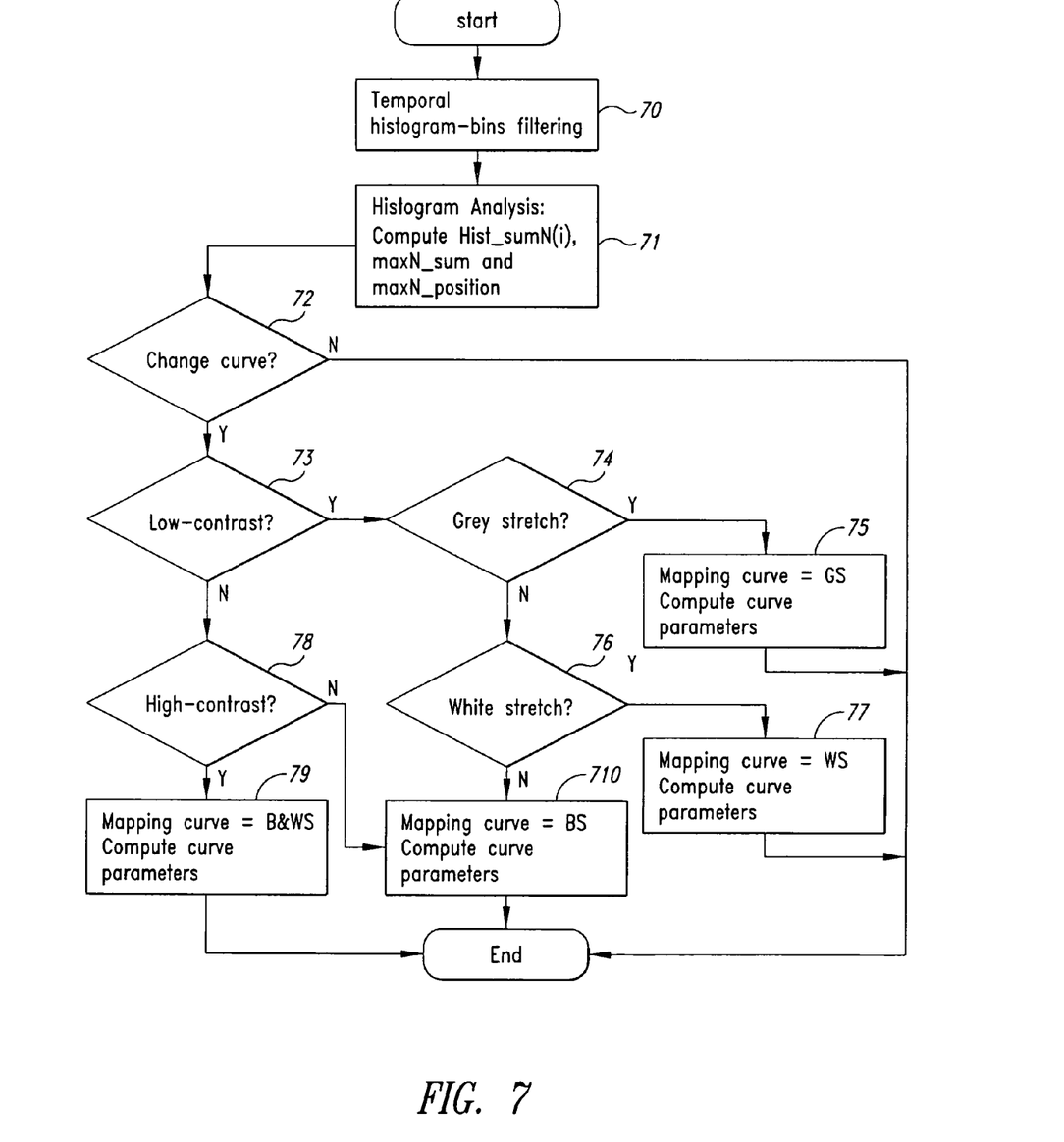
FIG. 7 is a flow diagram showing the algorithm used for processing a picture histogram and for selecting a suitable mapping curve based on the picture histogram.

FIG. 7 is a diagram showing the algorithm used for processing a picture histogram and for selecting a suitable mapping curve based on the picture histogram. The algorithm reflects the processing performed by the Mapping Functions Decision Process 58. Step 70 in FIG. 7 corresponds to the processing performed by the Temporal Filtering Block 52 and step 71 corresponds to the processing performed by the Histogram Analysis Block 53. As shown in step 71, the Histogram Analysis Block 53 calculates and passes to the Curve & Parameters Decision Block 54 a set of sums for N consecutive bin values, Hist_sumN(i), the largest total in each of the consecutive sums corresponding to each value of N, maxN-sum, and the band where the maximum sum occurs, maxN_position.

At step 72, the Curve & Parameters Decision Block 54 decides whether to allow a change in the type of mapping curve being used to enhance the current picture, and also determines any changes to the parameter settings for each mapping curve.

Generally, even a one-step change of gain of the same curve could result in a noticeable change in the stream of enhanced pictures when the scene is very slow and smooth. An example is when there is a smooth panning or transition from dark to bright in a same scene. A change of curve, range or gain due to the threshold method will naturally occur and it is noticeable due to the smooth transition in the same scene.

The difference (denoted as diff), in the histograms between the current and previous field picture (denoted as curr_histobin( ) and prev_histobin( ) respectively) is first calculated according to the pseudo-code shown in Listing 6 and normalized (denoted as Norm_Diff) within a range of 0 to 50 inclusive (which correspond to the range of values for WEIGHT_MAX):

Listing 6

For i = 0 to 15 {
    diff + =ABS(curr_histobin(i) − prev_histobin(i))
}
Norm_Dif f= (diff * WEIGHT_MAX + num_pixels_per_win) / (2 * num_pixels_per_win)

where num_pixels_per_win represents the number of pixels in each window. Note that in Listing 6 the difference, diff, represents the actual difference between the current and previous non-filtered field picture histogram, rather than the difference between the current and previous filtered field picture histogram as was computed for the weighting in the picture histogram by the Temporal Filtering Block 52 (see Listing 1).

To minimize any noticeable change in a slow scene transition due to imperfections or insufficiency of the mapping curves, a change of the range (or gain) or of the type of mapping curve used is not allowed during a smooth scene transition. A smooth scene transition is normally indicated by a Norm_Diff value that is less than WEIGHT_MAX/4 and where there is no associated scene-change detected by the Scene Change Detector 57, as indicated by the status of the Scene Change Flag. The computed value of Norm_Diff in Listing 6 has a range from 0 to WEIGHT_MAX. A higher value of Norm_Diff (i.e., close to the value of WEIGHT_MAX) indicates a large difference between the current picture and previous pictures (i.e., the scene transition is not smooth). Similarly, a low value of Norm_Diff (i.e., much lower than the value of WEIGHT_MAX) indicates only small differences between the current picture and previously processed pictures (i.e., the scene transition is smooth). Therefore, the threshold value is preferably set at WEIGHT_MAX/4. When the Scene Change Detector 57 detects a change in scene in the current field picture, the Scene Change Flag is set the boolean value of "TRUE". Where no scene change has been detected, the Scene Change Flag is set the boolean value of "FALSE". Thus the logic in step 72 to deciding whether to allow a change in the type of mapping curve being used is expressed as the pseudo-code provided in Listing 7:

Listing 7

Figure 8:
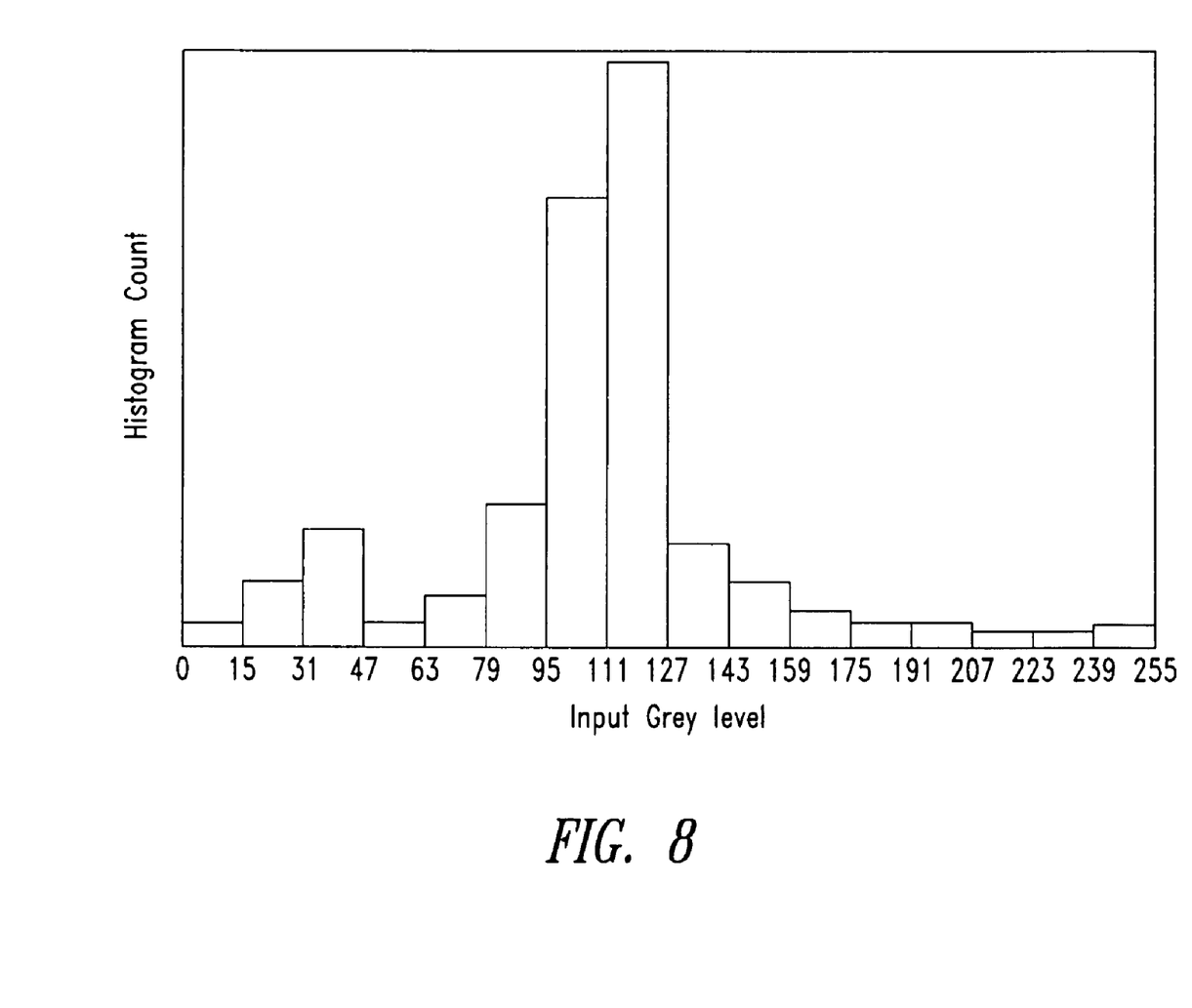
FIG. 8 is a diagram showing an example of the histogram output of a low-contrast picture that requires a Grey-Stretch mapping curve for contrast enhancement.

If (No-scene-change && (Norm_Diff < WEIGHT_MAX/4))
    THEN -> No switch of type of curve, no change in parameter settings are allowed A decision on whether the field picture histogram is low in contrast is made in step 73. Generally, a low-contrast picture will have a narrow-shaped histogram. Based on this assumption, the algorithm first decides whether the histogram is low in contrast. FIG. 8 shows a typical narrow-shaped histogram.

In the current example described above which uses a 16-band histogram, the histogram is said to be in low-contrast if any one of the nine sums calculated for Hist_sum7(i) exceeds the contrast-sensitivity threshold value. In general terms, a histogram is in low-contrast if any of the sums calculated for Hist_sumN(i), for the largest value of N, exceeds the corresponding contrast-sensitivity threshold value.

If an input picture is low in contrast, the picture may be enhanced by using one of either the Grey Stretch ("GS"), Black Stretch ("BS") or White Stretch ("WS") enhancement curves. The decision depends on where the narrow-shaped histogram is found on the horizontal axis (or brightness axis) of the histogram (item 61 in FIG. 6). The position of the maximum sum value for Hist_sumN(i) that exceeds the contrast-sensitivity threshold value, or the value maxN-position for the greatest value of N, is used to decide which enhancement curve is to be used.

In step 74, if the narrowly concentrated histogram is located at the middle region of the horizontal axis (i.e., it is not near the extreme dark and extreme bright area of the histogram), the GS curve is chosen to spread the histogram in an attempt to improve the contrast level of the picture. In the current example, the GS curve is chosen if the max7_position (range from 0 to 9) is between the values 2 to 4 inclusive. FIG. 8 shows a typical histogram example of a sequence for which the GS curve will be chosen at step 75.

Figure 1:
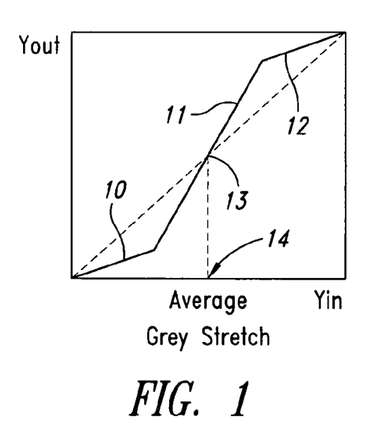
FIG. 1 is an example of a mapping curve for the Grey-Stretch ("GS") mapping function.

If the GS curve is suitable for correcting the histogram, the GS curve is selected and associated parameters for the GS curve is calculated in step 75. With reference to FIG. 1, one of the parameter settings (defined as the range setting) is the steepness of the slope of the middle segment 11 of the GS mapping curve. A steeper slope will stretch the histogram wider apart to increase the contrast. Therefore the range setting depends on the "narrowness" or concentration of the histogram. In the current example, this can be decided by looking at the values of the Hist_sum2(I), Hist_sum3(i) and Hist_sum4(i) measured by the Histogram Analysis Block 53. Note that one or more of the nine sums for Hist_sum7(i) has exceeded the contrast-sensitivity threshold level. An example of a very low-contrast picture (having a narrowly concentrated histogram) such as that shown in FIG. 8, is when max2_sum>0 (i.e., any one of the Hist_sum2(i) exceeds sum2_thres). A steeper middle-segment slope of the curve can then be used. The cross-over point 13 of the middle-segment slope is preferred to occur at the average luminance value of the picture on the horizontal axis 14. The average picture brightness can be estimated (est avg brightness) by the algorithm in the Histogram Analysis Block 53.

Another GS curve parameter setting to be decided is the left-segment 10 and right-segment 12 slopes of the GS curve. This setting is defined as the gain setting, and depends on the histogram levels at both ends of the brightness axis (e.g., item 61 in FIG. 6). For example, the three extreme left bins (found by Hist_sum3(0)) and the three extreme right bins (found by Hist_sum3(13)) can be used to determine the steepness of the left-segment slope 10 and right segment slope 12 respectively. For a low value of Hist_sum3(0), which indicates a small quantity of dark pixels in the picture, a less steep left-segment slope would be set. Less steep means that the left-segment slope 10 is more horizontal. Conversely, a high value of Hist_sum3(0) would yield a steeper left-segment slope 10. Likewise for a low value of Hist_sum3(13), which indicates a small quantity of bright pixels in the picture, a less steep right-segment slope would be set. Conversely, a high value of Hist_sum3(13) would yield a steeper right-segment slope 12.

If according to step 74 a GS curve is not appropriate for the current picture, the next step is to try to use a WS curve for correction in step 76.

In step 76, if the narrowly shaped histogram is located very close to the dark area (i.e., near the extreme left), the WS curve is chosen to improve the visibility of dark area details. In the current example, a WS curve is used if the condition in Listing 8 is satisfied:

---
Listing 8
---
if { (max7_position < 2) and ((Hist_sum2(0) *2) > num_pixels_per_win) }
--- where num_pixels_per_win represents the number of pixels in each window. For large values of N, max7_position can be replaced by a more general expression, maxN_position, corresponding to the largest value of N in the current picture histogram. Preferably, where an input histogram has B bins, the largest value of N is an integer value one less than half the value of B. For example, for 16 bins the maximum value of N may be 7.

Figure 9:
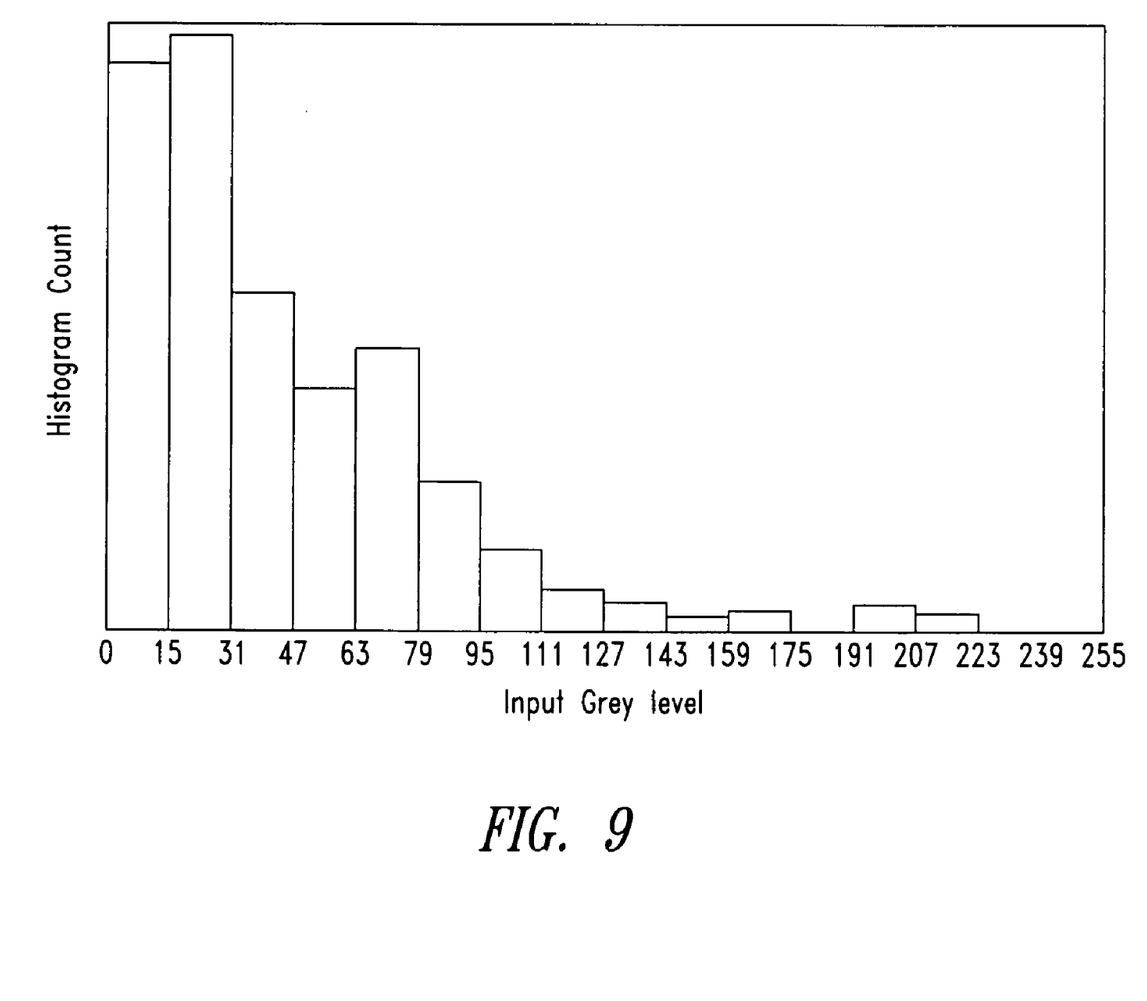
FIG. 9 is a diagram showing an example of the histogram output of a low-contrast dark picture that requires a White-Stretch mapping curve for contrast enhancement.

The next criteria checked is whether the sum of the first 2 bins is more than 50% of the histogram. This means that most of the pixels are heavily concentrated very closely to the dark area, and an example of such a histogram is shown in FIG. 9.

Figure 3:
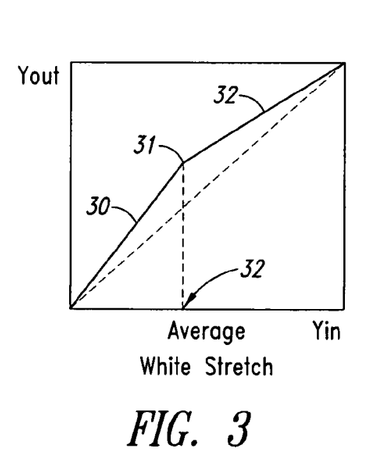
FIG. 3 is an example of a mapping curve for the White-Stretch ("WS") mapping function.

If the WS curve is suitable for correcting the histogram, the WS curve is selected and associated parameters for the WS curve is calculated in step 77. With reference to FIG. 3, the inflection point 31 of the WS curve occurs preferably at the average brightness 33. The gain setting of the WS curve decides how high the inflection point 31 of the curve should be. The estimated average brightness of the histogram (es-t_avg_brightness) calculated by the Histogram Analysis Block 53 can be used to decide the gain settings. For example, typically when a WS curve is chosen, the value of est_avg_brightness is generally quite low. Thus, a very low value of est_avg_brightness results in a higher gain setting. A not too low value of est_avg_brightness results in a lower gain setting. Minimal gain is achieved for a high value of est_avg_brightness. An example of a very low value of est_avg_brightness is a value less than 30, and a very high value of est_avg_brightness is a value higher than 100.

Figure 10:
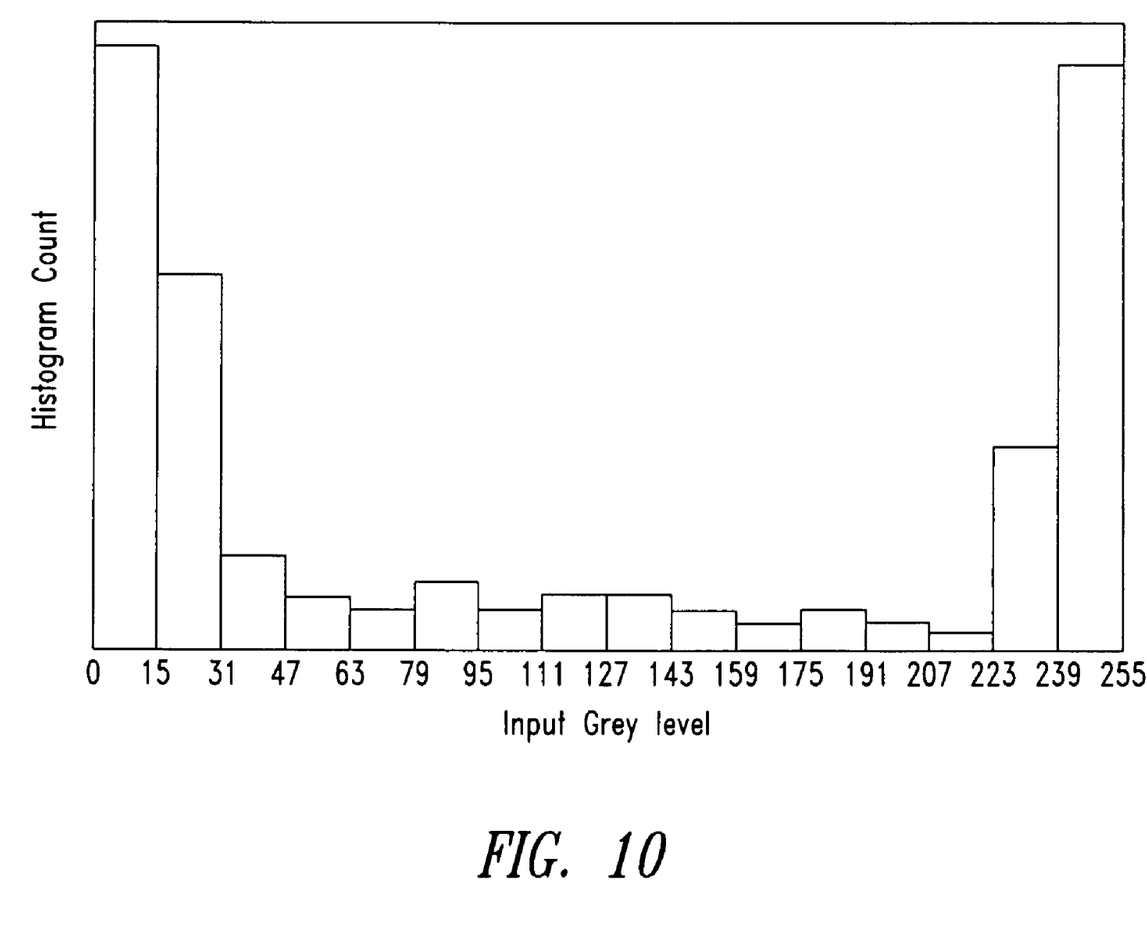
FIG. 10 is a diagram showing an example of the histogram output of an over-contrast picture that requires a Black & White-Stretch mapping curve for contrast enhancement.

However if, according to step 73, the picture was not low in contrast, a decision is made to determine whether the picture is over-contrast in step 78. In step 78, the algorithm detects any heavily concentrated histogram at the far left and right areas, which indicates that the sequence is over-contrast. FIG. 10 is an example of an over-contrast histogram. In the current example, the value of Hist_sum4(0) (corresponding to the low brightness area) and the value of Hist_sum4(12) (corresponding to the high brightness area) are preferably used in making the decision in step 78. More generally, it is preferable to use Hist_sum4(0) and Hist_sum4(P) to make the decision in step 78, where P is fourth last term in a picture histogram containing at least four bins. Preferably, Hist_sum4(0) and Hist_sum4(12) are used for a 16-band histogram. If, for example, the histogram has 32 bands (or bins), then it would be preferable to use Hist_sum8(0) and Hist_sum8(24), being the respective sums taken at the lowest and highest luminance extremes of histogram. If the sum of the consecutive bin values for both the high brightness and low brightness areas exceed a predefined threshold, defined as B&WS_sensitivity, and the absolute difference between the two are smaller than the difference threshold, defined B&WS_diff_thres (which indicates that both areas are possibly equally heavy), then the B&WS curve is chosen to stretch the histogram towards the central area of the brightness axis 61.

Example values of B&WS_sensitivity and B&WS_diff thres are set at 90% and 25% of the number of pixels per window respectively. FIG. 10 shows an example of histogram that is over contrast.

Figure 4:
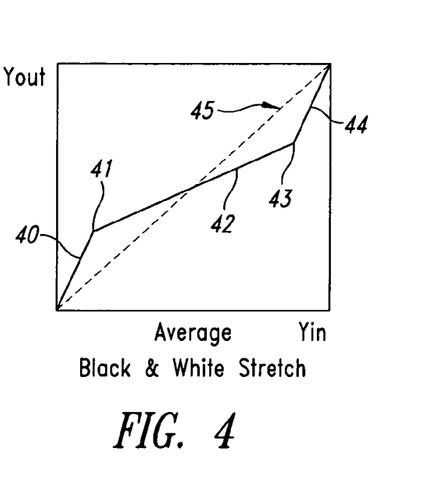
FIG. 4 is an example of a mapping curve for the Black & White Stretch ("B&WS") mapping function.

If the Black and White Stretch ("B&WS") curve is suitable for correcting the histogram, the B&WS curve is selected and associated parameters for the B&WS curve is calculated in step 79. With reference to FIG. 4, the range of the B&WS curve defines the positions of the corresponding inflections points of the left segment 40 and right segment 43. The position of the left 40, center 42 and right 44 segments fall into place upon determine the two inflection points 41 43. A higher range means that the inflection points occur more towards the center 42 and a lower range means the inflection points occur more towards the far ends (or away from the center 42). Therefore the range setting determines where the maximum stretch (i.e., the inflection points 41 and 43) will occur. The gain indicates how high or low each of the two inflection points 41 43 should be (i.e., to determine how steep the slopes of the left 40, center 42 and right 44 segments should be).

To determine the range setting in step 79, the positions of the most concentrated areas of brightness at the far left and right of the histogram is first determined. Preferably, the maximum value from either of Hist_sum2(0), Hist_sum2(1), Hist_sum2(2) and Hist_sum2(3) is used to determine the position of the maximum concentrated area at the far left of the histogram, and is further used to set the position of the left-segment inflection point 41. Similarly, it is preferable that the maximum value from either of Hist_sum2(11), Hist_sum2(12), Hist_sum2(13) and Hist_sum2(14) is used to determine the position of the maximum concentrated area at the far right of the histogram, and is further used to set the position of the right-segment inflection point 43. The inflection points 41 43 will typically occur at the most concentrated areas of the histogram, which also provides the basis for determining the maximum stretch.

The gain of the curve may depend on the amount of dark or bright pixels at the 2 heavily concentrated area. A high gain can set if the percentage amount of dark or bright pixels is high. With reference to FIG. 4, the gain indicates how high or low each of the two inflection points 41 43 should be. A high gain means the inflection points 41 43 are further away from the dotted line 45. Therefore if the percentage amount of dark pixels is high, the inflection point 41 will be placed higher (i.e., more vertically upwards compared to the current indicated position in FIG. 4). If the percentage amount of bright pixels is high, the inflection point 43 will be placed lower (i.e., more vertically downwards compared to the current indicated position in FIG. 4).

If step 76 decides that the WS curve is not suitable for correcting the histogram, and likewise, step 78 decides that the B&WS curve is also not suitable for correcting the histogram, the BS curve is selected by default and the associated parameters for the BS curve is calculated in step 710. The BS curve is the default curve, chosen when no other curve has been chosen, and can be effectively used to make the dark pixels darker to increase the contrast of pictures.

Figure 2:
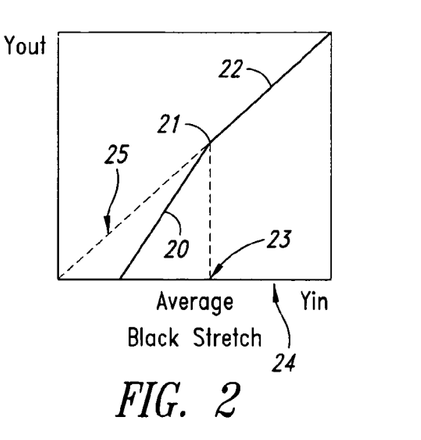
FIG. 2 is an example of a mapping curve for the Black-Stretch ("BS") mapping function.
Figure 11:
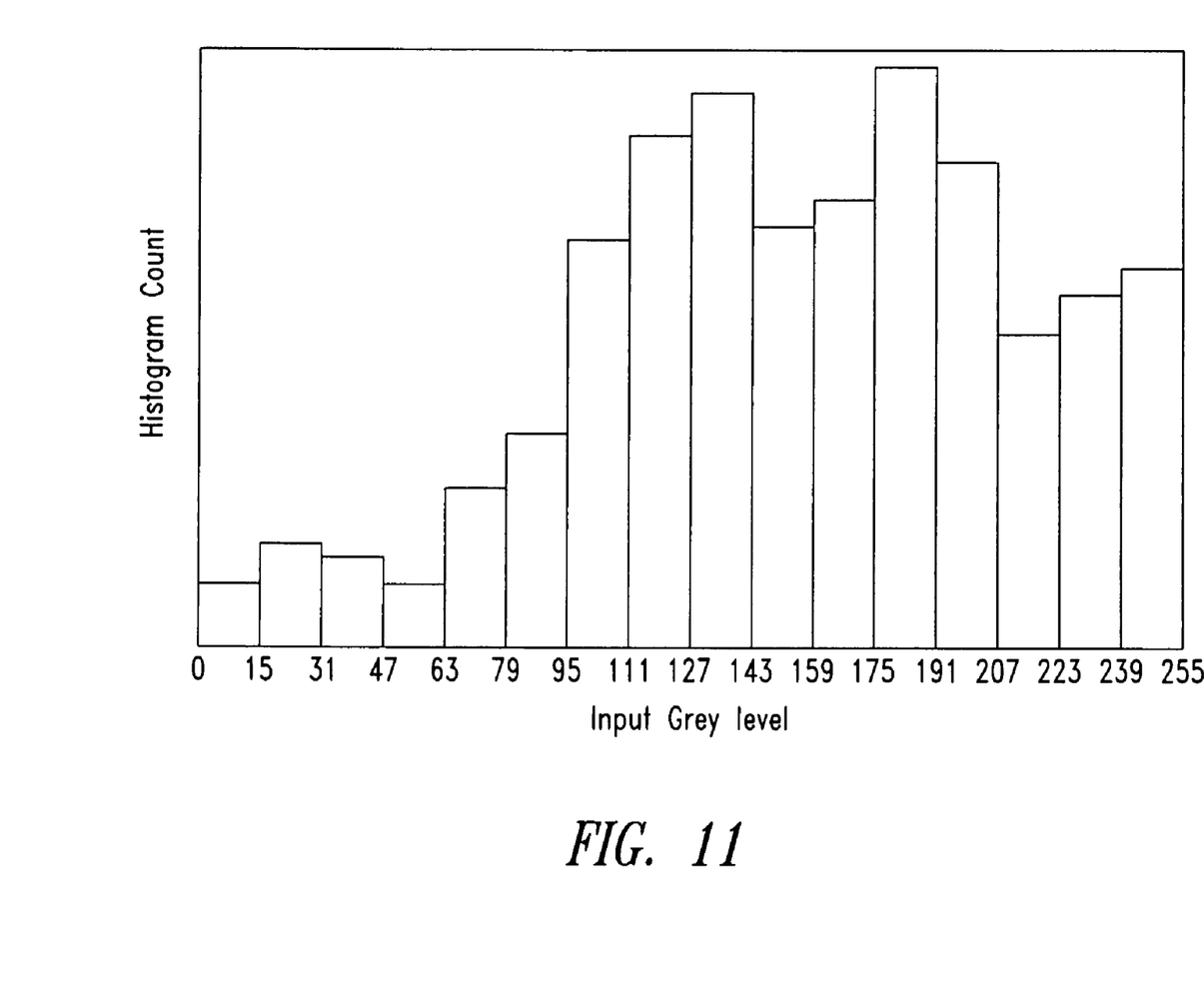
FIG. 11 is a diagram showing an example of the histogram output of a picture that a Black-Stretch curve can be used to improve the contrast.

With reference to FIG. 2, the inflection point 21 of the curve is preferred to occur at the average brightness position (represented by est_avg_brightness) 23 on the input brightness axis 24. The inflection point 21 is also preferably limited to a maximum value, BS_Average_upper_limit, which is preferably set at 100. It is preferable that the value of BS_Average_upper_limit is set a value with 70 to 120, inclusive. FIG. 11 shows an example of a histogram that a BS curve can be used to improve the contrast.

With reference to FIG. 2, the steepness of the left-segment slope 20, defined as the gain setting is to be set in step 79. A high gain means a steeper slope 20 is set. The BS curve is targeted for sequences with a high overall brightness or has few dark areas. The quantity of dark pixels in the field picture is used to determine the range and grin settings, which preferably depends on the percentage of dark pixels in the picture. Using the current example, the gain settings may be decided based on the percentage amount of Hist_sum4(0) compared to all pixels in the histogram ranging between 2 predefined percentage thresholds, the BS_th_low and BS_th_high. If the percentage of Hist_sum4(0) compared to all pixels in the histogram is less than the BS_th_low threshold, the maximum gain can be set (i.e., a steepest slope is set). However if the percentage of Hist_sum4(0) compared to all pixels in the histogram is equal to or higher than the BS_th_high threshold, the minimum gain or zero gain is set (which means no inflection at all). A minimum gain setting means the mapping curve has no inflection at all (i.e., slope 20 coincides with the dotted line 25 in FIG. 2 and forms a straight line with slope 22). This straight line 22 24 is at an angle of 45 degrees to the horizontal X-axis. An example of maximum gain is where slope 20 is at an angle of 65 degrees to the horizontal X-axis. For those percentage values of Hist_sum4(0), compared to all pixels in the histogram which fall within the BS_th_low and BS_th_high thresholds, a plurality of discrete gain setting positions are provided to correspond to each discrete and evenly spaced threshold intervals between the BS_th_low and BS_th_high thresholds. For example, the number of discrete gain settings can be any number between 15 and 50, inclusive. Where, for example, Hist_sum4(0) indicates a lower percentage of dark pixels within the threshold range which falls within the range of one of the intervals closer to the BS_th_low threshold, this translates into a particular discrete low gain setting corresponding to that interval. Alternatively where, for example, Hist_sum4(0) indicates a higher percentage value of dark pixels within the threshold range which falls within the range of one of the intervals closer to the BS_th_high threshold, this translates into a particular discrete high gain setting corresponding to that interval.

Example values of BS_th_low and BS_th_high may be 0 percent and 10 percent respectively.

It is further preferable that the low complexity algorithm for the Mapping Functions Decision Process 58, as shown in FIG. 7, be implemented in software made to run on a simple programmable controller or processor. When the algorithm in FIG. 7 is implemented in software, it can be flexibly applied a software add-on to any existing systems with switchable/selectable mapping functions.

This invention could also be applied to digital still pictures.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for enhancing the contrast of video pictures, comprising the steps of:
    (i) receiving an input video signal;
    (ii) extracting a picture from said input video signal;
    (iii) determining an active window for said picture;
    (iv) calculating a histogram for luminance values of pixels in said active window of said picture;
    (v) determining characteristics of said histogram;
    (vi) selecting one suitable mapping function from a plurality of mapping functions based on the determined characteristics of said histogram; and
    (vii) mapping the luminance value of each pixel in said picture in accordance with said selected mapping function.

2. The method of claim 1 wherein after step (v), said method includes the step of: step (v)(a) determining whether said picture is part of a smooth scene sequence.

3. The method of claim 2 further including after the step of step (v)(a): step (v)(b) preventing the selection of a new mapping function where said picture is part of a smooth scene sequence.

4. The method of claim 1 wherein step (iii) determines said active window for said picture by including only pixels from said picture that do not form part of any black bars at the boundaries of said picture.

5. The method of claim 1 wherein step (v) includes the step of calculating the weighted difference between the value of each bin of said histogram and the corresponding value in the same said bin of an earlier histogram relating to an earlier processed picture.

6. The method of claim 1 wherein step (v) includes the step of determining, for said histogram containing a maximum number of M bins, where M is an integer, where each said bin in said histogram are sequentially numbered, n, according to the pattern n, n+1, n+2 and so on, where n is greater than or equal to zero, the sum of Q consecutive bins by taking the sum of Q consecutive terms, starting from the term n=0 for all terms of n except for the terms of n greater than the term (M−n).

7. The method of claim 6 wherein step (v) includes the step of determining the maximum sum for each said calculated sum of Q consecutive bins.

8. The method of claim 7 wherein step (v) includes the step of determining the corresponding bin position for said maximum sum of each said calculated sum of Q consecutive bins.

9. The method of claim 8 wherein said value of Q ranges between 2 and ((M/2)−1).

10. The method of claim 1 wherein step (vi) includes the step of determining from said histogram, whether said picture is low in contrast, and if said picture is determined to be low in contrast, determining whether a Grey Stretch mapping function is suitable for correcting said contrast, and where said picture is not low in contrast, determining whether said picture is over contrast.

11. The method of claim 10 wherein, if said Grey Stretch mapping function is suitable for correcting said contrast, then a Grey Stretch mapping function is selected and associated parameters for said Grey Stretch mapping function are determined and applied to said Grey Stretch mapping function, and wherein if said Grey Stretch mapping function is not suitable, determining whether a White Stretch mapping function is suitable for correcting said contrast.

12. The method of claim 10 wherein, if said White Stretch mapping function is suitable for correcting said contrast, then a White Stretch mapping function is selected and associated parameters for said White Stretch mapping function are determined and applied to said White Stretch mapping function, and wherein if said White Stretch mapping function is not suitable, a Black Stretch mapping function is selected and associated parameters for said Black Stretch mapping function are determined and applied to said Black Stretch mapping function.

13. The method of claim 10 wherein if said histogram is over contrast, a Black and White Stretch mapping function is selected and associated mapping parameters are determined and applied to said Black and White Stretch mapping function, and wherein if said Black and White Stretch mapping function is riot suitable, a Black Stretch mapping function is selected and associated parameters for said Black Stretch mapping function are determined and applied to said Black Stretch mapping function.

14. The method of claim 1 wherein step (v) includes the step of temporally filtering the value of each bin of said histogram.

15. A method for enhancing video picture contrast, comprising:
determining an active window for a picture extracted from an input video signal;
determining characteristics of a histogram calculated for luminance values of pixels in the active window of the picture; and
mapping the luminance value of each pixel in the picture in accordance with a mapping function selected on the basis of determined characteristics of the histogram.

16. A method for enhancing video picture contrast, comprising:
receiving an input video signal at a histogram data circuit, a black bar detector circuit, a scene change detector, and a picture mapping circuit;
calculating a histogram for luminance values of pictures in an active window extracted from the picture in the histogram data circuit, the active window determined by including only pixels from the picture that do not form part of any black bars at the boundary of the picture as determined in the black bars detector circuit;
determining characteristics of the histogram in a histogram analysis circuit; and
mapping the luminance value of each pixel in the picture in a picture mapping circuit in accordance with a mapping function selected on the basis of determined characteristics from the histogram and generating therefrom an output video signal.

17. The method of claim 16, wherein determining characteristics of the histogram comprise calculating a weighted difference between a value of each bin of the histogram and a corresponding value in the same bin of an earlier histogram relating to an earlier processed picture.

18. The method of claim 17, wherein the step of determining characteristics of the histogram includes determining for the histogram containing a maximum number of M bins the sum of Q consecutive bins by taking the sum of Q consecutive terms, starting from the term n=0 for all terms of n except for the terms of n greater than the term (M−n), where M is an integer, and wherein each bin in the histogram is sequentially numbered n, according to the pattern n, n+1, n+2 and so on, where n is greater than or equal to zero.

19. The method of claim 18 wherein the value of Q ranges between 2 and ((M÷2)−1).

20. A method for enhancing video picture contrast, comprising:
determining an active window for a picture extracted from an input video signal by including only pixels from the picture that did not form part of any black bars at the boundaries of the picture:
calculating a histogram for luminance values of pixels in the active window of the picture,
determining the characteristics of the histogram, including determining whether the picture is part of a smooth scene sequence, and if the picture is part of a smooth scene sequence, preventing the selection of a new mapping function, and further including the step of calculating the weighted difference between the value of each bin of the histogram and a corresponding value in the same bin of an earlier histogram relating to an earlier processed picture, and determining for the histogram a maximum number of M bins, where M is an integer, where each bin in the histogram is sequentially numbered n, according to the pattern n, n+1, n+2, and so on, where n is greater than or equal to zero, the sum of Q consecutive bins is determined by taking the sum of Q consecutive terms, starting from the term n=0 for all terms of n except for the terms of n greater than the term (M−n), and further including the steps of temporarily filtering the value of each bin of the histogram and determining the maximum sum of the calculated sum of Q consecutive bins, including determining the corresponding bin position for the maximum sum of each calculated sum of Q consecutive bins; and
mapping the luminance value of each pixel in the picture in accordance with a selected mapping function based on the determined characteristics of the histogram, including the step of determining from the histogram whether the picture is low in contrast, and if the picture is determined to be low in contrast, determining whether a gray stretch mapping function is suitable for correcting the contrast, and where the picture is not low on contrast, determining whether the picture is over contrast.

21. The method of claim 20, wherein, if said Grey Stretch mapping function is suitable for correcting said contrast, then a Grey Stretch mapping function is selected and associated parameters for said Grey Stretch mapping function are determined and applied to said Grey Stretch mapping function, and wherein if said Grey Stretch mapping function is not suitable, determining whether a White Stretch mapping function is suitable for correcting said contrast.

22. The method of claim 20, wherein, if a White Stretch mapping function is suitable for correcting said contrast, then the White Stretch mapping function is selected and associated parameters for the White Stretch mapping function are determined and applied to the White Stretch mapping function, and wherein if the White Stretch mapping function is not suitable, a Black Stretch mapping function is selected and associated parameters for said Black Stretch mapping function are determined and applied to said Black Stretch mapping function.

23. The method of claim 20, wherein if the histogram is over contrast, a Black and White Stretch mapping function is selected and associated mapping parameters are determined and applied to said Black and White Stretch mapping function, and wherein if said Black and White Stretch mapping function is riot suitable, a Black Stretch mapping function is selected and associated parameters for said Black Stretch mapping function are determined and applied to said Black Stretch mapping function.

* * * * *

UNITED STATES PATENT AND TRADEMARK OFFICE
CERTIFICATE OF CORRECTION

PATENT NO. : 7,424,148 B2  
APPLICATION NO. : 10/878981  
DATED : September 9, 2008  
INVENTOR(S) : Kwong Huang Goh It is certified that error appears in the above-identified patent and that said Letters Patent is hereby corrected as shown below:

Title Page
Item (*) Notice, "942 days" should read as -- 967 days --

Column 15
Line 42, "function is riot suitable, a Black Stretch mapping function is" should read as -- function is not suitable, a Black Stretch mapping function is --

Column 16
Line 7, "a picture mapping circuit in accordance with a mapping function" should read as -- the picture mapping circuit in accordance with a mapping function --

Column 16
Lines 11-13, "wherein determining characteristics of the histogram comprise calculating a weighted difference" should read as -- wherein determining characteristics of the histogram comprises calculating a weighted difference --

Column 16
Line 34, "boundaries of the picture:" should read as -- boundaries of the picture; --

Column 16
Line 36, "the active window of the picture," should read as -- the active window of the picture; --

UNITED STATES PATENT AND TRADEMARK OFFICE
CERTIFICATE OF CORRECTION

PATENT NO. : 7,424,148 B2
APPLICATION NO. : 10/878981
DATED : September 9, 2008
INVENTOR(S) : Kwong Huang Goh It is certified that error appears in the above-identified patent and that said Letters Patent is hereby corrected as shown below:

Column 16
Lines 64-65, "determining whether a gray stretch mapping function is suitable for correcting" should read as -- determining whether a Grey Stretch mapping function is suitable for correcting --

Signed and Sealed this

Sixteenth Day of December, 2008

JON W. DUDAS
*Director of the United States Patent and Trademark Office*